Nov. 1, 1960  A. E. F. JOHNSON ET AL  2,958,555
BUMPER STRUCTURE
Filed Dec. 29, 1955
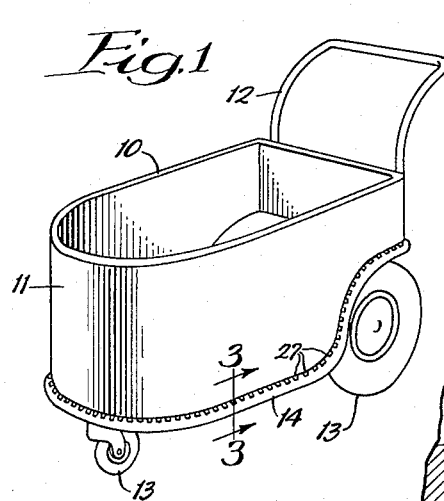
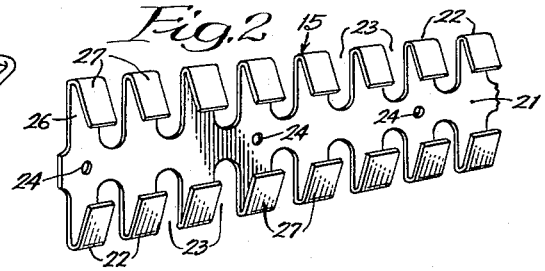
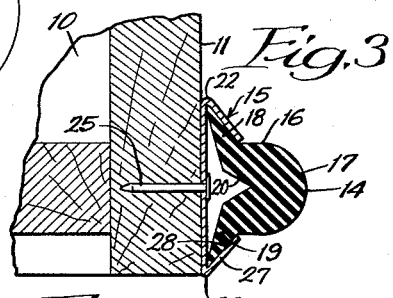
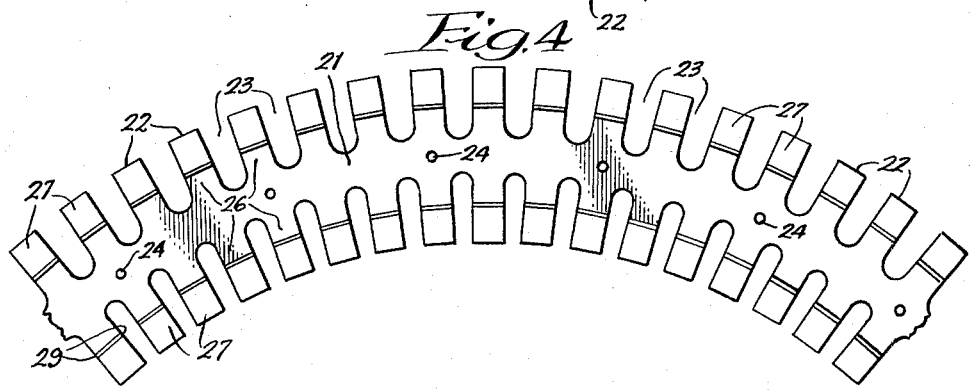
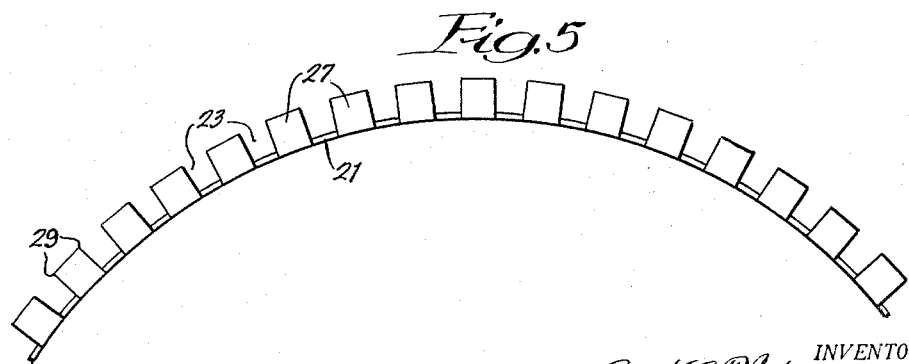
INVENTORS:
Axel E. F. Johnson and
Clarence W. Ensminger United States Patent Office 2,958,555
Patented Nov. 1, 1960

2,958,555
BUMPER STRUCTURE

Axel E. F. Johnson and Clarence W. Ensminger, Cincinnati, Ohio, assignors to American Hospital Supply Corporation, Evanston, Ill., a corporation of Illinois Filed Dec. 29, 1955, Ser. No. 556,121

3 Claims. (Cl. 293—62)

This invention relates to bumper structures, and more specifically to an improved structure for supporting a resilient bumper strip.

A principal object of the present invention is to provide a bumper support channel which is adapted to conform with the contour of a cart, wagon or other structures without breaking or buckling. Another object is to provide a channel which may be arched along its longitudinal axis and which is effective for maintaining a resilient bumper strip in operative position, the bumper strip being easily detachable therefrom when replacement of that strip is desired. A further object is to provide a channel member which may be flexed along its longitudinal axis, and which is adapted to detachably receive the legs of a resilient bumper strip, the channel accommodating inward flexure of the legs and maintaining the bumper strip in operative position when force is applied to the exposed head portion of that strip.

Other objects will appear from the specification and drawings, in which—

Figure 1 is a perspective view of a cart equipped with the bumper structure of the present invention; Figure 2 is a broken perspective view showing a section of the flexible or bendable bumper support channel; Figure 3 is a broken cross sectional view illustrating the bumper structure in mounted position, and taken along lines 3—3 of Figure 1; Figure 4 is a broken front elevation showing vertical flexure of the bendable channel member; and Figure 5 is a broken top plan view of the channel showing horizontal flexure thereof.

Referring to the drawings, Figure 1 shows a cart generally represented by the numeral 10, having an open bin 11, a handle 12 and wheels 13. Cart 10 is equipped with a bumper structure 14 embodying the present invention, and extending about the curved lower edge of bin 11. It is to be understood, however, that the cart shown in Figure 1 is merely illustrative of one type of vehicle upon which the present bumper structure may be mounted, and that the present invention may also be used in connection with other structures.

The bumper structure consists essentially of a channel member 15 and a resilient bumper strip 16. As illustrated in Figure 3, bumper strip 16 has a generally double V-shaped cross section. A head portion 17 is equipped with outwardly and rearwardly diverging legs 18 which are preferably formed integrally therewith. The bumper strip 16 may be molded or otherwise fashioned from rubber or any other resilient material having rubberlike characteristics.

Like the resilient bumper disclosed in the pending application, Serial No. 514,612, filed June 10, 1955, now Patent No. 2,873,993 dated February 17, 1959, strip 16 responds differently to impacts of varying magnitude. When a force is exerted against the bumper head, the tapered legs which are more responsive than the head portion because of their reduced dimensions, flex inwardly toward each other and rearward toward channel 15. The sloping bottom or rear surfaces 19 of the legs adjacent central notch 20 are, therefore, urged into contact with the channel member. This flexure of the legs is sufficient to absorb or cushion mild impact upon head 17. When the impact is severe, however, the flexing of the legs will be immediately followed by distortion of the head portion 17 so that greater resistance to the force will be offered.

This invention is principally concerned with a channel member which will cooperate with this bumper strip by securely supporting the flexible legs thereof, and which may be mounted upon irregular or curved surfaces, such as the bin of cart 10. The channel member essentially consists of a flexible or bendable strip of material, such as steel or other similar metal, having an elongated center portion 21 and having a plurality of hooks 22 along opposite edges thereof. The strip may be formed from steel or from any other suitable metal. Each of the hooks of the upper and lower series are of the same size and shape, and are uniformly spaced apart by notches or slots 23. Furthermore, as shown best in Figure 2, the hooks and slots of the upper and lower series are in vertical alignment. Openings 24 may be provided at spaced intervals along the central portion 21 for receiving nails 25 or other appropriate connecting means.

To accommodate the inward and rearward flexure of legs 18 within the channel, it is important that the shank portions 26 of the hooks lie along the same vertical plane as center portion 21. End portions 27 of the hooks are straight and are angled inwardly and forwardly to conform with the sloping outer surfaces 28 of the bumper legs when the bumper strip is in normal or unflexed position. Preferably, the ends of the hooks are squared to provide corners 29 which tightly grip the bumper strip when the channel member is flexed or bent, as will appear shortly.

The channel member may be flexed in a variety of directions along its longitudinal axis, to conform with the contour of carts, wagons or other structures to be protected by the bumper structure. It is believed apparent that flexure of the channel is permitted by slots 23 which alter in size and shape according to the direction in which the support channel is arched. For example, the channel may be curved along a vertical plane passing through center portion 21, as shown in Figure 4. It will be seen that the upper slots are thereby expanded, while the lower slots are reduced in size along the arc of curvature. In other words, the upper hooks along the curved portion are moved further apart, while the corresponding lower hooks are brought into closer relation. Since the hooks and slots of the upper and lower series are in radial alignment, the channel member may be evenly flexed without buckling or breaking.

As already indicated, the bumper strip is preferably formed of a rubber-like material which will adapt itself to the curvature of the channel. When the channel is curved along a vertical plane, the right-angled corners 29 of the hooks are helpful in gripping the bumper strip and in maintaining legs 18 within that channel. It is to be noted, however, that the opposing ends of the upper and lower hooks are spaced far enough apart to permit rearward movement of bumper head portion 17 whenever a rearwardly directed force is exerted thereupon.

Figure 5 illustrates flexure of the channel member along a horizontal plane. In the illustration given, it will be seen that the hooks 22 have been moved further apart because of the curvature of the channel. When the resilient bumper strip is mounted upon the channel, it will define the outer circumference of the curve and tend to cling tightly to the channel. It will be understood, of course, that the channel member might be curved in the opposite direction along a horizontal plane so that the bumper strip defines the inner circumference of that curve. In such a case, the hooks 22 will be spaced more closely together to insure proper seating of the bumper strip within the channel. In addition, adjacent corners of the hooks will tend to grip the outer or front surfaces of legs 18 to prevent longitudinal sliding movement of the bumper strip within the channel.

While a preferred embodiment of the present invention has been described as illustrated, it will be understood that various modifications may be made in the structure without departing from the spirit or scope of this invention.

We claim:

1. A bumper structure comprising a channel, and an elongated resilient bumper carried thereby, said channel having an elongated central portion and a plurality of opposing hooks along opposite edges thereof, said hooks being interspaced by a plurality of slots and being provided with shank portions disposed substantially along the same plane as said central portion and with converging end portions sloping outwardly away from the central portion, said converging end portions of opposing hooks terminating in spaced apart relation and defining a longitudinal opening for said channel, said resilient bumper having a pair of diverging legs within said channel and having a head portion with parallel side surfaces projecting outwardly through said opening, said diverging legs being tapered and terminating in edges seated within said hooks at the junction of the shank and end portions thereof, said legs having inner surfaces normally spaced from the central portion of the channel and having outer surfaces normally engaging the end portions of said hooks, said legs being flexible inwardly towards said central portion to permit partial retraction of said head into said channel through the opening thereof when inwardly-directed impact forces are applied against said head, said hooks having the edges thereof defining said slots in frictional engagement with the edges of said legs to prevent longitudinal displacement of said bumper along said channel when said legs are flexed.

2. A bumper structure comprising a channel, and an elongated resilient bumper carried thereby, said channel having an elongated central portion and a plurality of opposing hooks along opposite edges thereof, said hooks being interspaced by a plurality of slots and having converging end portions defining a longitudinal opening for said channel, said bumper having a pair of diverging legs within said channel and having a head portion slidable inwardly and outwardly within said opening, said diverging legs being tapered and terminating in longitudinal edges seated within the opposing hooks of said channel, said legs having inner surfaces normally spaced from the central portion of said channel and having outer surfaces normally engaging the end portions of said hooks for limiting outward movement of said head, said legs being flexible inwardly towards said central portion for partial inward retraction of said head through said opening when inwardly-directed forces are applied against the head, said hooks having the edges thereof defining said slots in frictional engagement with the longitudinal edges of said legs for preventing longitudinal displacement of the bumper along said channel.

3. The structure of claim 2 in which said hooks are equipped with laterally extending shank portions lying along substantially the same plane as the central portion of the channel.

References Cited in the file of this patent

UNITED STATES PATENTS

| | | |
|---|---|---|
| 234,574 | Higgin | Nov. 16, 1880 |
| 1,754,112 | Lusse | Apr. 8, 1930 |
| 1,837,775 | Howard | Dec. 22, 1931 |
| 1,972,283 | Zimmers | Sept. 4, 1934 |
| 2,049,501 | Herron | Aug. 4, 1936 |
| 2,434,504 | Merrill | Jan. 13, 1948 |
| 2,443,959 | Merrill | June 22, 1948 |
| 2,509,722 | Carl | May 30, 1950 |
| 2,873,993 | Savke | Feb. 17, 1959 |

FOREIGN PATENTS

| | | |
|---|---|---|
| 249,314 | Great Britain | Mar. 25, 1926 |
| 858,506 | Germany | Dec. 8, 1952 |